United States Patent [19]

Guckel et al.

[11] Patent Number: 5,251,952
[45] Date of Patent: Oct. 12, 1993

[54] FOLDING HOOD FOR MOTOR VEHICLES

[75] Inventors: Martin Guckel, Wiernsheim; Jürgen Schrader, Weil im Schönbuch, both of Fed. Rep. of Germany

[73] Assignee: Mercedes-Benz AG, Fed. Rep. of Germany

[21] Appl. No.: 904,017

[22] Filed: Jun. 25, 1992

[30] Foreign Application Priority Data

Jun. 27, 1991 [DE] Fed. Rep. of Germany ....... 4121226

[51] Int. Cl.$^5$ .............................................. B60J 7/00
[52] U.S. Cl. .................................. 296/107; 296/108; 296/122
[58] Field of Search ............... 296/107, 108, 116, 117, 296/122

[56] References Cited

U.S. PATENT DOCUMENTS 4,854,634  8/1989  Shiraishi et al. ............... 296/117 X
5,026,110  6/1991  Koop et al. ..................... 296/108

FOREIGN PATENT DOCUMENTS 651973  7/1935  Fed. Rep. of Germany .

*Primary Examiner*—Joseph D. Pape
*Attorney, Agent, or Firm*—Evenson, McKeown, Edwards & Lenahan

[57] ABSTRACT

A motor vehicle folding hood has a hood part which rests on a bodywork component when the hood is closed and is connected thereto via locking apparatus. A pivot mounting of the hood part is provided on a further hood part on the side opposite to the locking side, about the bearing axis of which the hood part can be swung up into a lift-off position after unlocking thereof, as well as automatic pivot drive of the unlocked hood part via a spring loading. A drive device for the spring-loaded drive, which is regenerated after the downward pivoting of the hood part into its bearing position, is supported on the mutually connected end regions of the two hood parts at a moment distance from the bearing axis. In order to be able to provide a more compact configuration of the articulated connection between the lockable hood part and the hood part adjacent thereto, the drive device for the spring-loaded drive is configured as a supporting arrangement with limited longitudinal variability which is arranged below the bearing axis and is supported by opposite ends on the hood parts. The supporting arrangement operates with enlargement of its regenerated supporting length.

7 Claims, 3 Drawing Sheets

FOLDING HOOD FOR MOTOR VEHICLES

BACKGROUND AND SUMMARY OF THE INVENTION

The present invention relates to a folding hood for motor vehicles, and, more particularly, to a folding hood of the type having a hood part which rests on a bodywork component when the hood is closed and is connected thereto via locking means. A pivot mounting of the hood part is provided on a further hood part on the side opposite to the locking side, about the bearing axis of which the hood part can be swung up into a lift-off position after unlocking thereof. An automatic pivot drive of the unlocked hood part via a spring loading, a drive device for the spring-loaded drive, which is regenerated after the downward pivoting of the hood part into its bearing position, is supported on the mutually connected end regions of the two hood parts at a moment distance from the bearing axis.

A folding hood of this general type is shown, for example, in German Patent No. 651,973, and simplifies operation of the hood during opening and closing thereof. The spring-loaded drive has two sleeve-shaped rubber springs, each of which is arranged between articulated sleeves of the lateral roof frame parts. Since the rubber springs are connected on their peripheral sides with the assigned articulated sleeves, they act as turning and sliding springs. The function of the drive device is effected by the articulated sleeves enclosing the outer periphery of the rubber springs, with radially arranged supporting apparatus projecting from each of these articulated sleeves and interacting with associated stop surfaces on the opposite roof frame part. Because of the sleeve-shaped rubber springs, the joints lying between the front and rear roof frame parts of the hood frame have a relatively large volume. As a result, they require a not insignificant installation space which, with many forms of hood, will not be available to the design engineer.

An object of the present invention is to develop a folding hood such that the articulated connection can be much more compactly configured between the lockable roof part and the roof part adjacent thereto.

This object has been achieved, according to the present invention, by configuring a drive device for the spring-loaded drive as a supporting arrangement with limited longitudinal variability which is arranged below a bearing axis or hinge joint and is supported by opposite ends on the hood parts, with the supporting arrangement operating with enlargement of its regenerated supporting length.

BRIEF DESCRIPTION OF THE DRAWINGS

These and further objects, features and advantages of the present invention will become more apparent from the following detailed description of a currently preferred embodiments when taken in conjunction with the accompanying drawings wherein.

DETAILED DESCRIPTION OF THE DRAWINGS

Figure 1:
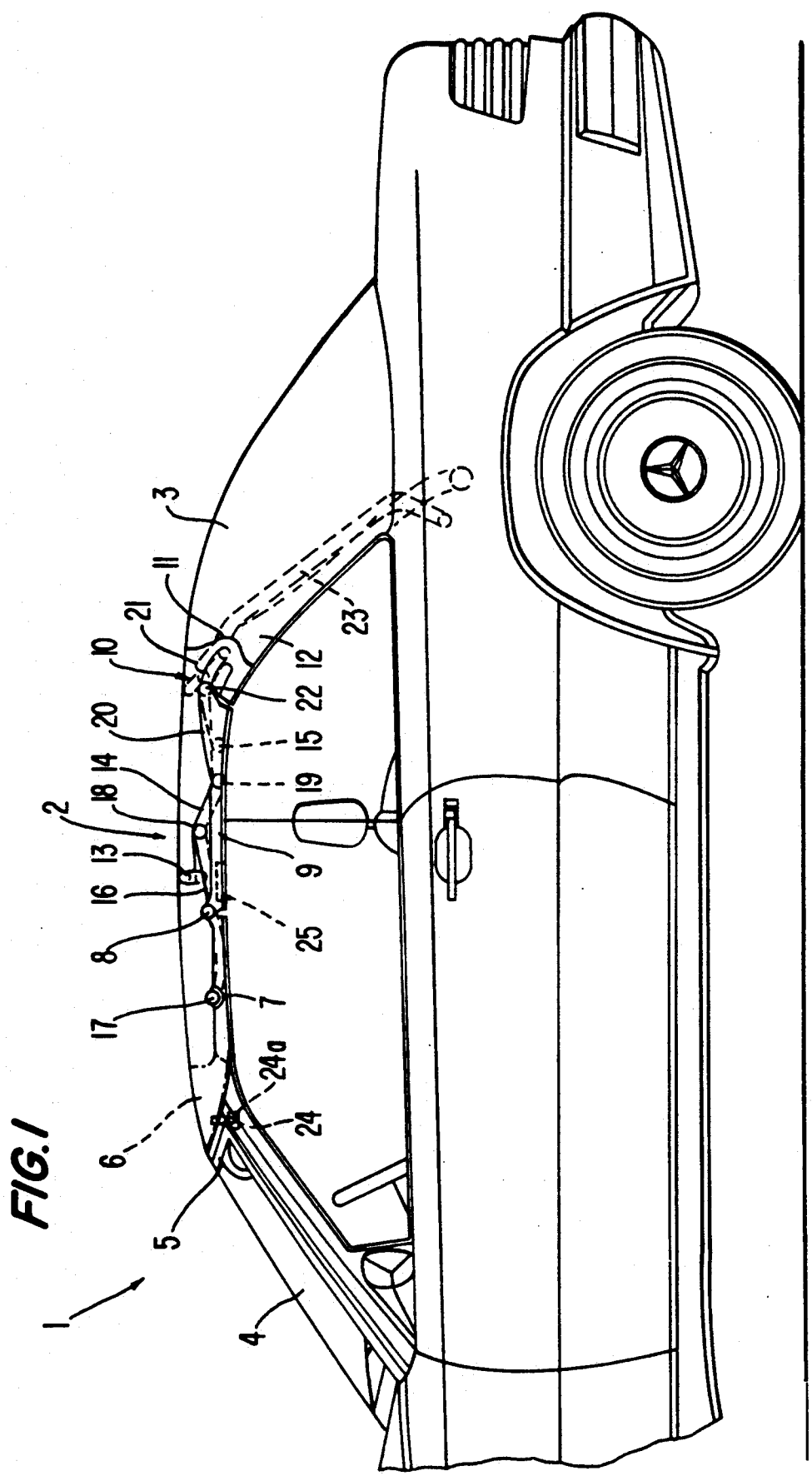
FIG. 1 is a partial side view of an automobile with a closed folding hood shown in its entirety with portions cut-away to show portions of a roof frame.

A convertible car 1 shown partially in FIG. 1 is provided with a folding hood 2 which comprises, in a known way, a supporting hood frame and a textile material hood cover 3 stretched on the hood frame to cover the passenger compartment of the convertible car 1 when in the illustrated closed state. In a longitudinal region situated above the side windows of the convertible car 1, the hood cover 3 is shown in a cut-away view. Consequently, the upper frame parts of the folding hood 2 on the left-hand side of the vehicle are visible and extend in mirror symmetry to the invisible frame parts on the unillustrated right-hand side of the vehicle.

A roof member 6, extending over the entire width of the roof, is situated on a coachwork frame 5 running above the windscreen 4. This roof member 6 is locked to the coachwork frame 5 at two points, via front hood closures, when the hood 2 is closed and securely retains the hood cover 3 at the front. The lateral limiting surfaces of the roof member 6 each make a transition into a front roof frame part 7 which is immovably fixed to the roof member 6 and extends rearwardly in the longitudinal direction of the vehicle, running above the side window of the convertible car 1. A front part of the hood 2 is thus restricted on three peripheral sides by supporting frame parts.

Rear ends of the roof frame parts 7 are each connected, via a hinge joint 8, to the front end of a rear roof frame part 9, which extends the lateral roof frame up to a main arch 10 and is attached by its rear end, via a hinge joint 11, to the associated hood pillar 12 or the main arch 10. A hood part adjoining the front part of the hood 2 is thus likewise restricted on three peripheral sides by supporting frame parts specifically by the central tube of the main arch 10 and the two roof frame parts 9.

For the intermediate support of the hood cover 3 stretched between the central tube of the main arch 10 and the roof member 6, an intermediate arch 13 is provided which rests on the underside of the hood cover 3. The intermediate arch 13 is retained by arch levers 14 connected to its lateral ends, extending obliquely downwards and attached by their rear ends, via a hinge joint 15 in each case, to the associated roof frame part 9, approximately at the longitudinal center of the roof frame parts 9. The intermediate arch 13 is held in its design position by lateral connecting rods 16, the front end of each of which is connected via a hinge joint 17 to a middle region of the associated roof frame part 7, and the rear end of each of which is connected via a hinge joint 18 to a middle region of the associated arch lever 14. At a distance behind the hinge joint 18, the arch levers 14 have another hinge joint 19 to which is connected a front end of a roof frame connecting rod 20. From the hinge joint 19, the roof frame connecting rod 20 extends obliquely backwards and upwards to the hood pillar 12, where it is connected thereto via a hinge joint 21.

At a distance in front of the hinge joint 11, a main connecting rod 23 engages, via a further hinge joint 22, on the rear roof frame part 9 which is articulated by its lower end (not shown) on the bodywork at an appropriate distance in front of the main bearing of the hood pillar 12. Since the geometric axes of the bearings of all the hinge joints of the folding hood 2 are aligned parallel to the main axis extending at right angles to the longitudinal central plane of the convertible vehicle 1, and the lateral wall frame parts of the folding hood 2 are each connected together to form a rod mechanism comprising a plurality of parallelogram-shaped articulated quadrilaterals, a constrained motion of the hood frame as a function of the backward pivoting movement of the main arch 10 is principle possible, as is desirable for the simple backward movement of the folding hood 2 after unlocking of the roof member 6.

The parallelogram-shaped articulated quadrilaterals of the hinge joints 8, 15, 17, 18 and 11, 15, 19, 21, respectively, are, however, when the hood 2 is closed and also after unlocking of the roof member 6, in an extended position which is close to dead center. As a result, constrained motion of the kinematics of the hood is impeded. When the hood 2 is opened manually, the effect of this is to make operation considerably more difficult, since the hood 2 has to be awkwardly lifted in front, at the roof member 6, before it can be moved backwards. In addition, automatic actuation of the hood by remote-controllable servomotors is not readily possible.

Figure 2:
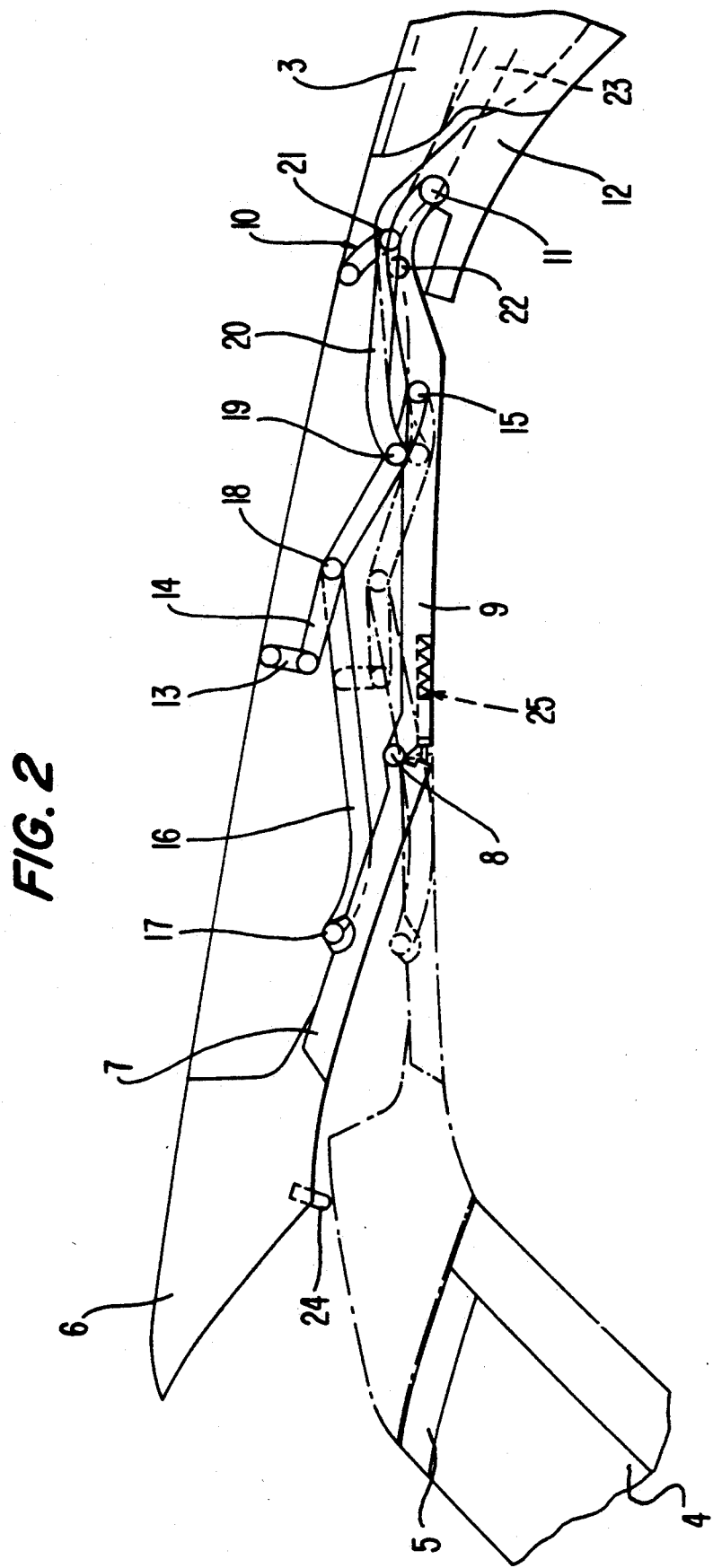
FIG. 2 is an isolated view of the folding hood of FIG. 1 after a first phase of opening movement has taken place.

In order that this impediment to the constrained motion should not continue to exist after unlocking of the front hood closures, and in order that the closing pins 24 projecting downwardly from the underside of the roof member 6 should not be able to fall back into the associated hood closures on the coachwork frame 5, the front hood part is, after the release of the roof member 6, automatically pivoted up about the geometric bearing axis of the hinge joint 8 into a lift-off position in which a sufficient spreading of the articulated quadrilaterals exists. This lift-off position, deflected here through an angle of about 20°, can be seen most clearly in FIG. 2.

To bring about the automatic pivoting advance of the front hood part in the course of the operation of unlocking the roof member 6, a spring-loaded drive 25 is provided and encompasses drive devices arranged on each side of the folding hood 2 in mirror symmetry with each other so that only one need be illustrated and described.

Each of the two drive devices 25 is configured as a longitudinally variable supporting device arranged at a moment distance below the geometric bearing axis of the hinge joint 8 and extending in the longitudinal direction of the roof frame. The drive devices are supported at opposite ends on the end regions of the two roof frame parts 7, 9. If the supporting arrangement comprises slidable elements, as is the case for example with a telescopic configuration, it may be particularly expedient, especially from considerations of production technology, to provide a supporting arrangement whose length can be linearly varied, and thus to provide axial support on the roof frame parts 7, 9.

Figure 3:
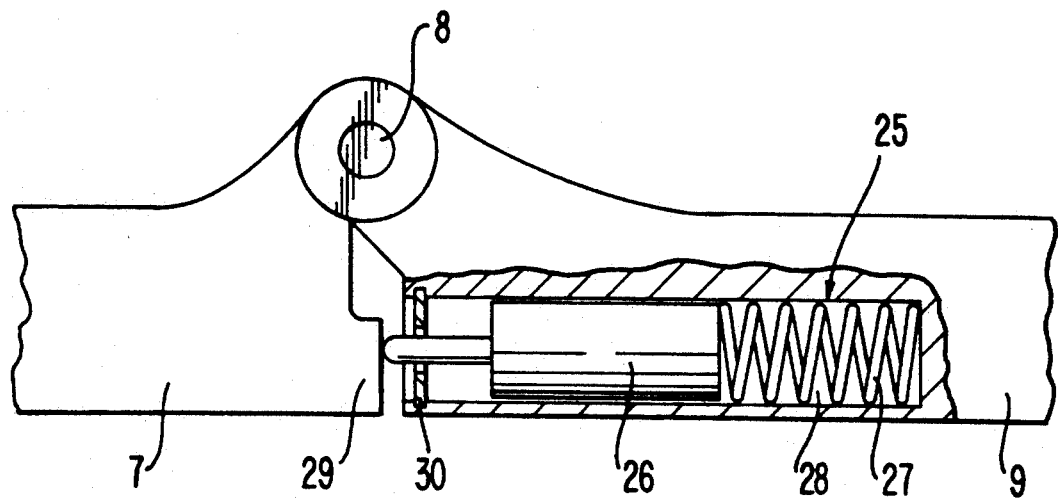
FIG. 3 is an isolated, partial cross-sectional view of a supporting arrangement between the lateral roof frame parts with the hood closed.
Figure 4:
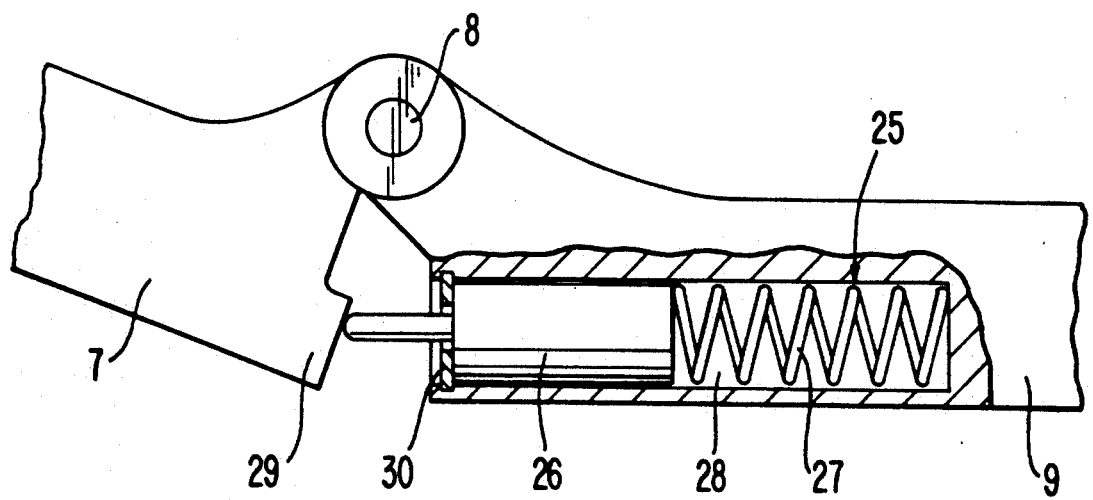
FIG. 4 is a view similar to FIG. 3 but showing the supporting arrangement after completion of the first phase of opening movement.

As can be seen in connection with the individual illustrations of the spring-loaded drive 25 in FIGS. 3 and 4, a supporting arrangement whose length can be linearly varied preferably consists of a combination of a push-rod 26 which is mounted to be axially displaceable and a coaxially compressible helical compression spring 27, arranged in series in a common tubular guide 28. The tubular guide 28 is immovably attached to the roof frame part 9 and extends close to the bottom edge of the roof frame part 9 parallel to the median longitudinal axis thereof. The cylindrical bore of the tubular guide 28 starts from the front end edge surface of the roof frame part 9, since it is integrated into the profile cross-section of the roof frame part 9 in a space-saving manner. The push-rod 26 projecting from the end of the tubular guide 28 bears with its rear end on the front end of the helical compression spring 27 which, in turn, is supported via its rear end on a bottom surface of the tubular guide 28. Hence, the helical compression spring 27 serves as a pre-loaded spring and becomes increasingly tensioned during the insertion of the push-rod 26 into the tubular guide 28.

The end of the push-rod 26 projecting from the tubular guide 28 has a convexly rounded impact surface at its end and is supported on an opposing support stop 29 located at the rear end surface of the front frame part 7. When the push-rod 26 is pushed out its axial advance is thus converted into an upward-directed pivoting advance of the roof frame part 7 about the bearing axis of the hinge joint 8. The impact surface of the push-rod 26 rolls on the counter-surface of the support stop 29.

So that the outward pushing movement of the push-rod 26 ends when the lift-off position of the roof frame part 7 is reached, the end region of the push-rod 26 projecting from the tubular guide 28 has a lesser diameter than the longitudinal region to the rear thereof which is adapted to the diameter of the tubular guide 28. As a result, an annular shoulder is produced at the thickening point. This annular shoulder interacts with an annular stop 30, as shown in FIG. 4, through which passes the tapered end region of the push-rod 26, and which projects from the wall of the bore of the tubular guide 28 to which the annular stop 30 is connected with axial support.

In the last phase of the closing movement of the folding hood 2, the front hood part is pivoted about the bearing axis of the hinge joint 8, for the purpose of locking the roof member 6 to the coachwork frame 5. The closing pins 24 engage in associated rotary spring locks 24a of a known type. When this occurs, the support stops 29 of the roof frame parts 7 pivot backwardly on a circular path about their hinge joint 8, pressing the push-rod 6 out of its pushed-out initial position shown in FIG. 4 into a storage position as shown in FIG. 3 in which it is substantially pushed into the tubular guide 28. The axial advance of the push-rod 26 caused thereby results in the longitudinal compression of the helical compression spring 27, which thus stores spring-release energy.

In the rear end position of the push-rod 26, the helical compression spring 27 is fully regenerated, and its regenerated length is maintained as long as the roof frame parts 7 and 9 are in their extended position, as shown in FIG. 3. As soon as the roof member 6 is unlocked, however, the roof frame parts 7 are released and are pivoted upwardly by the associated push-rod 26, which is pushed out by the expanding helical compression spring 27, until the push-rod 26 has adopted its pushed-out initial position. The front hood part is then situated in its lift-off position, following which the folding hood 2 can readily be opened again.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A folding hood for a motor vehicle, comprising:
   a first roof frame part which rests on a frame portion of the motor vehicle when the hood is closed and is connected thereto via locks for securing a locking side of the hood,
   a second roof frame part, pivot mounted to the first roof frame part on a side thereof opposite to the locking side about a bearing axis of which the first roof frame part can be swung up into a lift-off position after unlocking thereof,
   an automatic pivot spring-loaded drive attached to the first roof frame part, and
   a drive device for the spring-loaded drive configured to be regenerated during downward pivoting of the first roof frame part into a bearing position, and supported on mutually connected end regions of the roof frame parts at a moment distance from the bearing axis, wherein the drive device for the spring-loaded drive is configured as a supporting arrangement with limited longitudinal variability arranged below the bearing axis and is supported by opposite ends on the roof frame parts, with the supporting arrangement arranged to operate by enlargement of its regenerated supporting length.

2. The folding hood according to claim 1, wherein the supporting arrangement is linearly variable with respect to its length, ends of the supporting arrangement being axially supported on the roof frame parts.

3. The folding hood according to claim 2, wherein the supporting arrangement comprises a push-rod axially displaceable mounted and a coaxially compressible compression spring, and is arranged on one of the roof frame parts, with the end of the push-rod interacting with a support stop on the other of the roof frame parts.

4. The folding hood according to claim 3, wherein a common tubular guide slidably guides the push-rod and the compression spring.

5. The folding hood according to claim 4, wherein the tubular guide is integrated into a supporting component of one of roof frame parts.

6. The folding hood according to claim 1, wherein the first roof frame part is a front roof frame part of the hood which comprises, as supporting frame components, a roof member and two lateral roof frame parts connected to each other via the roof member, and connected in an articulated manner to roof frame parts of the second roof frame part which are adjacent thereto, and the supporting arrangement is provided on both sides of the hood between the roof frame parts adjacent each other.

7. A folding hood for motor vehicles, comprising:
   a first roof frame part which rests on a frame portion of the motor vehicle when the hood is closed and is connected thereto via a locking device for securing a locking side of the hood;
   a second roof frame part pivotably mounted to the first roof frame part on a side opposite the locking side about a bearing axis of which the first roof frame part can be swung into a lift-off position after unlocking thereof,
   an automatic pivot drive attached to the first roof frame part via a spring loading drive,
   a drive device for the spring-loaded drive, which is regenerated during downward pivoting of the first roof frame a part into a bearing position, and is supported on the mutually connected end regions of the roof frame parts at a distance from the baring axis and is designed as a supporting arrangement with a limited longitudinal variability arranged below the bearing axis and is supported by opposite ends on the roof frame parts said drive device consisting of a combination of a push rod, which is axially displaceably mounted in a tubular guide, and a coaxially compressible compression spring, said drive device being arranged on one of the hood parts, the end of the push rod interacting with a support stop on the other hood part, wherein the tubular guide is integrated into a supporting component of the first roof frame in such a manner, that the push rod projects out of the front edge surface of the first roof frame part, and in that the support stop interacting with the push rod end is arranged on the opposite front edge surface of the second roof frame part.

* * * * *